Aug. 26, 1969　　　I. A. ELLMAN　　　3,462,840
DENTAL DISPENSER WITH CALCIUM HYDROXIDE PASTE
Filed June 3, 1965
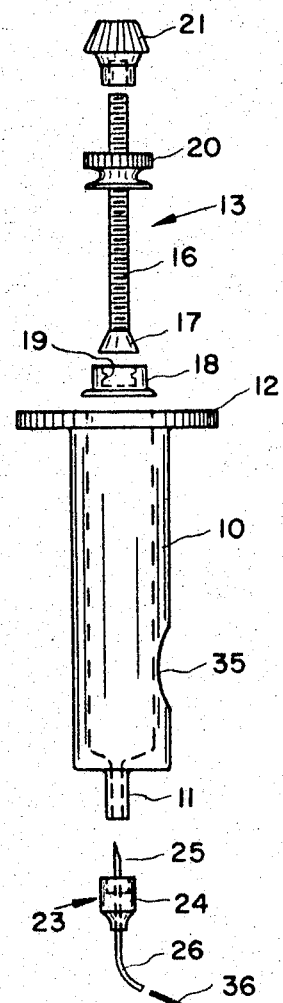
Fig. 1
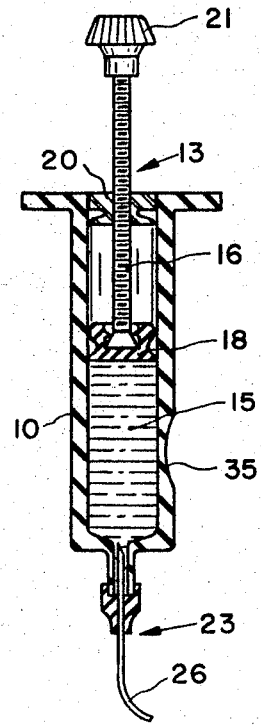
Fig. 2
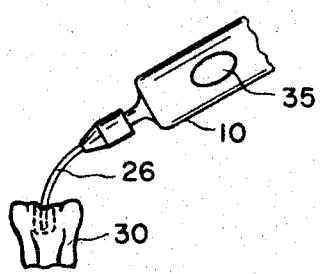
Fig. 3
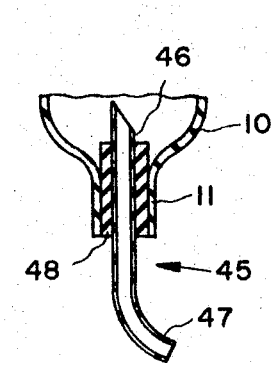
Fig. 5
Fig. 4
INVENTOR.
I. A. ELLMAN
BY
ATTORNEY ated Aug. 26, 1969

3,462,840
DENTAL DISPENSER WITH CALCIUM HYDROXIDE PASTE

Irving A. Ellman, Valley Stream, N.Y.
(1 Auerbach Lane, Lawrence, N.Y. 11559)
Filed June 3, 1965, Ser. No. 460,952
Int. Cl. A61c 5/04
U.S. Cl. 32—60      3 Claims

ABSTRACT OF THE DISCLOSURE

A device for dispensing a controlled amount of a calcium hydroxide paste for lining a cavity. It includes an air-tight applicator with a micrometer screw feed. The paste includes a hydroxyethyl cellulose binder which reduces the tendency of the paste to harden in the container, and also includes barium sulphate as a radiographic opacifying agent to make the liner radiographically visible. An auxiliary container also containing a calcium hydroxide paste is used for receiving the needle of the applicator between times of use to prevent needle clogging.

---

This invention relates to a dental preparation useful for cavity lining or pulp capping, a device for dispensing controlled minute quantities of said dental preparation to the tooth cavity, and the method of cavity lining or pulp capping using the said dental preparation or dispensing device.

U. S. Patent 2,599,445 describes a prepared paste containing calcium hydroxide, water and a methyl cellulose binder available in a collapsible plastic tube for the purposes mentioned above. In use, it is necessary to squeeze material out of the tube, carry it by some instrument to the tooth cavity, and then spread it over the desired area. A number of difficulties have been experienced in carrying out this technique. The paste adheres to the end and the sides of the instrument and frequently encounters and adheres to the cavity sides where it is not wanted. It is more difficult to carry out the technique with the upper teeth. The paste has a tendency to harden in the tube, which makes it more difficult to spread. It is difficult to control the amount of paste employed and thus obtain a thin lining as desired rather than a thick base. The liner is radiolucent and often mistaken for secondary decay.

One object of my invention is a new dental preparation useful for cavity lining or pulp capping.

Another object of my invention is a dispensing device for dispensing controlled quantities of said dental preparation to the area of a tooth cavity desired.

A further object of my invention is combined container and dispenser of said dental preparation paste which retards hardening of the paste.

Still another object of my invention is a new method for cavity lining and pulp capping using my new dental preparation or dispensing device or both.

These and other objects of my invention are achieved in my invention, which I now briefly describe. My new dental preparation makes two important changes in the composition of the prior art paste. First, I replace the methyl cellulose binder with a hydroxyethyl cellulose binder. I have found that this sharply reduces the tendency of the paste to harden in the container. Second, I include a radiographic opacifying agent to make the liner radiographically visible. My new device comprises an air-tight applicator provided with a micrometer screw feed for dispensing controlled minute quantities of the paste via a curved needle directly to the tooth area desired. A novel construction is provided to prevent paste hardening prior to actual use. My new method involves use of the dispensing device to apply a small controlled amount of the paste to the tooth surface, which may be spread where desired to form a thin, paint-like covering as desired.

The invention will now be described in greater detail with reference to the accompanying drawing, in which:

FIG. 1 is an exploded view of one form of dispensing device in accordance with my invention;

FIG. 2 is a cross-sectional view of the device of FIG. 1 as assembled;

FIG. 3 shows the device of FIG. 2 being used to line a tooth cavity;

FIG. 4 shows the use of an auxiliary container to retard hardening of the paste;

FIG. 5 shows a modification of the needle mounting.

My new prepared paste is a water based, calcium hydroxide type, cellulose gum mixture. It is applied as a cavity lining under all fillings to reduce post-operative complaints of thermal and chemical sensitivity, and as a film to protect the pulp by reducing inflammation, neutralizing acidity, and stimulating secondary dentine formation. When the cellulose film is dissolved by the saline water blood, the contained calcium hydroxide is liberated for therapeutic pulpal protection. My improved composition includes calcium hydroxide, hydroxyethyl cellulose, barium sulphate and water. The ingredients are thoroughly mixed together to form a paste. As one preferred composition, the calcium hydroxide constituted 45% by weight, the barium sulphate 5% by weight, the hydroxyethyl cellulose 2% by weight, and the water the remaining 48% by weight. The barium sulphate, which is inert, and is included as a radiographic opacifying agent, is used to make the liner radiographically visible, so its presence would not be mistakenly diagnosed as secondary decay. It may vary between 2 and 10% by weight. Other inert opaque materials can also be used, such as silver powder or zirconium powder. I use the hydroxyethyl cellulose because I find it reduces the tendency of the paste to harden in the container, improves its spreadability, and assists in maintaining proper paste consistency. It may vary between 1 and 5% by weight. The calcium hydroxide will vary between 30–60% by weight, and sufficient water is used to give the paste the desired consistency.

My novel paste is packaged in a novel dispenser affording a micrometer screw feed to enable controlled minute quantities of the paste to be discharged as desired. One form of dispenser in accordance with my invention is illustrated in FIGS. 1 and 2. It comprises a hollow, tubular, elongated container or barrel 10, preferably of plastic, provided with a hollow nozzle or hub 11 at its lower end and a finger retaining flange 12 at its upper end. A plunger or piston 13 is employed to extrude the paste content 15.

The piston 13 comprises a threaded rod or screw 16 with a tapered or enlarged head 17 for engaging a rubber or like elastomeric gasket seal 18. As shown in FIG. 2, the rubber gasket, which is forced onto the enlarged screw end 17, and is held in place by an internal rib 19, has a diameter which enables it to fit snugly on the inside bore of the barrel container 10 so as to seal off the paste 15 in an airtight manner and prevent hardening thereof. At the top end of the opening in the barrel 10 is secured a knurled nut 20 with a center threaded hole engaged by the threaded rod 16. A knob 21 is secured to the end of the rod 16 so as to rotate it when the knob is rotated. As will be evident, when the knob and rod 16 are rotated, the rod slowly advances into the barrel at a controlled rate slowly extruding paste 15 through the outlet nozzle 11.

On the hub 11 is mounted a double ended needle applicator 23. As shown, the applicator comprises a collar 24 adapted to be push-fitted and thus secured to the barrel hub 11. The needle has a first hollow straight portion 25 which extends into the hub 11 and a second hollow portion 26 which is gently curved as illustrated. The inside projecting portion 25 keeps the hub 11 orifice unclogged with hardened paste. The outside curved portion 26 enables the device to be used, as illustrated in FIG. 3, for directly applying the extruded paste to the patient's tooth 30, wherever located, especially for applying the paste inside a cavity made in the tooth prior to its filling. Such a result could not be achieved with a straight needle.

The controlled dispensing rate of the paste is achieved by providing a fine thread on the rod 16, such as 30 threads to the inch. An additional control is provided, in accordance with a further feature of the invention, by providing a slightly flexible wall portion on the barrel 10. This is accomplished by hollowing out, as shown at 35, a wall of the barrel in the general shape of a finger, which can serve as a finger rest. The thinned down wall portion is resilient. By squeezing or pressing at the thinned section 35, additional paste can be extruded.

As is clear from the foregoing, various features are available to retard or inhibit hardening of the paste upon exposure to air while inside the dispenser rendering it unsuitable for its intended purpose. These include the use of the hydroxyethyl cellulose which maintains spreadability and resists drying out, the interior projecting needle portion 25 to prevent clogging of the discharge orifice, and the constantly advancing piston 13 which keeps the paste compartment constantly full thus preventing aspiration from hardening same. Additional features are also provided to ensure the above results. These include a flexible metal pin or stylet 36, which is inserted in the hollow needle end 26 when not in use to keep the paste in the needle bore from hardening. Another construction, illustrated in FIG. 4, employs an auxiliary container 40 whose interior is filled with calcium hydroxide paste and whose entrance is sealed off with a rubber plug 41 with a center opening 42, which remains normally closed, through which the needle end 26 may be inserted. By inserting the needle 26 into the auxiliary paste sealed off from the outside air, when not in use, hardening of any paste within the needle 26 is greatly retarded. With these additional features, pastes with other binders are also useful, e.g., replacing the cellulose binder with a casein binder in the same relative proportions.

FIG. 5 illustrates a modification which provides a disposable needle. The applicator in this case comprises a needle 45 having a straight portion 46 for projecting into the hub 11 and a curved portion 47 for application of the paste to the tooth. A plastic insert or tubing 48 is fitted within the hub 11 opening, and the needle portion 46 is pushed through the insert into the barrel as shown. The insert and needle cooperate to provide a substantially airtight friction fit. Thus, instead of sterilizing the needle applicator 23 as illustrated in FIG. 1 after each use, the used needle 45 is disposed of and replaced by a new needle for the next use.

The dispenser illustrated in FIGS. 1 and 2 is easily manufactured as follows. The gasket 18 is mounted on the screw head 17, and the rod 16 threaded into the nut 20. The nut 20 is heated and pushed into the barrel opening. The heated nut spreads the contacted plastic, which flows when heated. Upon cooling, the plastic shrinks locking the nut 20 in the position shown in FIG. 2. The screw is retracted, and then the paste forced into the barrel through the hub end until full. Then the hub 11 is closed off with a plastic cap until ready for use. In use, the cap is removed, the needle applicator 23 mounted, and the knob 21 rotated until the desired quantity of paste is available at the tip of the hollow needle end 26. Using this end permits accurate placing and spreading of paste on the floor of the cavity without touching the margins to form the desired thin layer, which quickly hardens to protect the pulp.

While the invention has been described in connection with a particular form of dispenser, it will be appreciated that other constructions providing a micrometer feed to extrude the paste in the form of tiny droplets will be evident to those skilled in the art, and thus the illustrated form is meant to be mainly exemplary. While the particular form described and illustrated in detail offers the advantages of simple, inexpensive manufacture, I do not desire to be limited thereto except where expressly done so in the appended claims:

What is claimed is:

1. A dispenser for dental use comprising a first container having a discharge outlet at one end, a hollow needle coupled to the discharge outlet, a rotatable piston mounted at another end of said first container, a large supply of a tooth pulp protecting paste in the container and engaged by the piston, means for causing the piston when rotated to advance into the first container causing extrusion of a small portion of the paste through the discharge outlet and hollow needle, said paste comprising an air-hardenable, water-based, cellulose gum, calcium hydroxide mixture comprising barium sulphate as an opacifying agent and hydroxyethyl cellulose as the cellulose gum, in combination with an auxiliary sealed second container substantially filled with a supply of a calcium hydroxide paste, and a needle-permeable resilient plug sealing off said auxiliary second container, said plug being permeable to said hollow needle and receiving same to enable the needle to become embedded in the calcium hydroxide paste in the second container to seal off the needle bore and retard hardening of the paste in the first container between times of use.

2. A dispenser as set forth in claim 1 wherein calcium hydroxide constituted 30-60% by weight of the mixture, the hydroxyethyl cellulose 1-5% by weight of the mixture, and the barium sulphate 2-10% by weight of the mixture.

3. A dispensed for dental use comprising a first tubular container having a discharge outlet at one end, a curved hollow needle coupled to the discharge outlet, a threaded fitting sealed in the opposite end of the container, a threaded plunger rod engaging said fitting and provided with a sealing gasket on its interior end, a large supply of a tooth pulp protecting paste in the container and engaged by the sealing gasket, means for rotating the plunger to advance same into the first container causing extrusion of a small portion of the paste through the discharge outlet and hollow needle, said paste comprising an air-hardenable, water-based, cellulose gum, calcium hydroxide mixture, said tubular container including a thinned down wall portion to enhance its flexibility such that the application of finger pressure thereto will cause a further extrusion of the paste, in combination with an auxiliary sealed second container substantially filled with a second supply of the same calcium hydroxide paste, and a needle-permeable resilient plug sealing off said auxiliary second container, said plug being permeable to said hollow needle and receiving same to enable the needle to become embedded in the calcium hydroxide paste in the second container to seal off the needle bore and retard hardening of the paste in the first container between times of use.

References Cited

UNITED STATES PATENTS

| 833,044 | 10/1906 | Goodhugh | 32—60 |
| 1,288,174 | 12/1918 | Pittenger | 128—216 |
| 2,142,780 | 1/1939 | Fortney | 32—1 |
| 2,599,445 | 6/1952 | Gordon | 106—35 |
| 3,096,763 | 7/1963 | McConnaughey et al. | 128—221 |

FOREIGN PATENTS

| 378,330 | 8/1932 | Great Britain. |

ROBERT PESHOCK, Primary Examiner